United States Patent
Kim (10) Patent No.: US 11,182,716 B2
(45) Date of Patent: Nov. 23, 2021

(54) COST EFFICIENCY TRACKING FOR CONFIGURATION MANAGEMENT DATABASE

(71) Applicant: Coupang, Corp., Seoul (KR)

(72) Inventor: Tae Kyung Kim, Seoul (KR)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 16/777,541

(22) Filed: Jan. 30, 2020

(65) Prior Publication Data

US 2021/0241195 A1 Aug. 5, 2021

(51) Int. Cl.
| | |
|---|---|
| *G06Q 10/06* | (2012.01) |
| *G06F 16/958* | (2019.01) |
| *G06F 16/23* | (2019.01) |
| *H04L 29/06* | (2006.01) |
| *G06F 9/50* | (2006.01) |
| *G06F 9/54* | (2006.01) |
| *G06Q 30/02* | (2012.01) |
| *G06F 9/455* | (2018.01) |

(52) U.S. Cl.
CPC ... *G06Q 10/06315* (2013.01); *G06F 9/45558* (2013.01); *G06F 9/5077* (2013.01); *G06F 9/547* (2013.01); *G06F 16/2379* (2019.01); *G06F 16/958* (2019.01); *G06Q 30/0283* (2013.01); *H04L 63/105* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 10,120,727 B2* | 11/2018 | Bartfai-Walcott | G06F 9/5077 |
| 2011/0173319 A1* | 7/2011 | Ha | G06F 9/5077 |
| | | | 709/224 |
| 2013/0054426 A1* | 2/2013 | Rowland | G06F 9/5072 |
| | | | 705/27.2 |

(Continued)

FOREIGN PATENT DOCUMENTS

| | | |
|---|---|---|
| JP | 5097750 | 12/2012 |
| JP | 2019-053672 | 4/2019 |

OTHER PUBLICATIONS

Mitch Garnaat, GitHub Repository for Skew Programming Library, https://github.com/scopely-devops/skew, Mar. 31, 2019 (4 pages).

(Continued)

*Primary Examiner* — Charles E Anya
(74) *Attorney, Agent, or Firm* — Finnegan, Henderson, Farabow, Garrett & Dunner, LLP (57) ABSTRACT

Methods and systems for resource usage tracking are disclosed. In one embodiment, an exemplary method comprises receiving a request to assign a first role to at least one virtual server; configuring the virtual server to associate the first role with a first resource of the virtual server; modifying a database to include an identifier associated with the virtual server and an identifier of the first role assigned to the virtual server; receiving, from the virtual server, indications of first resource usage; calculating a first resource cost as a combination of costs associated with each of the received indications; mapping the first resource cost to the first role; and modifying a user interface element for presentation on a web page to include the cost mapped to the first role.

17 Claims, 5 Drawing Sheets

(56) References Cited

U.S. PATENT DOCUMENTS

| | | | | |
|---|---|---|---|---|
| 2014/0143211 A1* | 5/2014 | Baker | ................ | G06F 16/2365 |
| | | | | 707/691 |
| 2015/0006730 A1* | 1/2015 | Helfman | ............... | G06F 9/5072 |
| | | | | 709/226 |
| 2015/0378604 A1 | 12/2015 | Kawakami et al. | | |
| 2016/0277511 A1 | 9/2016 | Fang et al. | | |
| 2016/0321115 A1* | 11/2016 | Thorpe | ............. | G06Q 10/0631 |
| 2016/0337215 A1 | 11/2016 | Wunderlich et al. | | |
| 2018/0157532 A1* | 6/2018 | Kumar | ................. | G06F 9/5061 |
| 2018/0302295 A1* | 10/2018 | Suzuki | ................. | H04L 41/147 |
| 2019/0260648 A1* | 8/2019 | Poort | .................... | G06F 9/5066 |
| 2020/0313987 A1* | 10/2020 | Hintermeister | ....... | H04L 43/065 |

OTHER PUBLICATIONS

Office Action from Korean Intellectual Property Office in Korean Application No. 10-2020-0055320, dated May 4, 2021 (8 pages).
International Search Report in PCT Application No. PCT/IB2020/060907, dated Feb. 25, 2021.

* cited by examiner

|  | | Sales | | Research & Development |
|---|---|---|---|---|
|  |  | Web Hosting | Email Archives | Neural Network Training |
| Virtual Server A | Processor A | ✓ |  | ✓ |
|  | Storage A | ✓ | ✓ |  |
|  | Connectivity A |  |  |  |
| Virtual Server B | Processor B |  |  | ✓ |
|  | Storage B |  | ✓ |  |
|  | Connectivity B | ✓ |  |  |
| Virtual Server C | Processor C | ✓ |  | ✓ |
|  | Storage C | ✓ | ✓ |  |
|  | Connectivity C |  |  |  |

COST EFFICIENCY TRACKING FOR CONFIGURATION MANAGEMENT DATABASE

TECHNICAL FIELD

The present disclosure generally relates to computerized systems and methods for tracking cost efficiency of virtual servers using a configuration management database. In particular, embodiments of the present disclosure relate to a system that receives a request to assign a processing, storage, or communication role to a virtual server. The system configures the virtual server to associate the role with a resource of the virtual server and determines costs associated with the role. The costs are mapped to the role and presented on a web page. In this way, a single configuration management database may quickly track cost efficiency of multiple roles which may be distributed among many different resources or virtual servers.

BACKGROUND

Proliferation of virtual servers has broadened access to large computing resources at low costs. Various corporations provide virtual server resources, also known as cloud computing. Further, companies, universities, and government organizations utilize virtual servers to host websites, perform complex computer simulations, and store large databases, among other services. Virtual servers provide secure, reliable, and scalable computational resources to clients, enabling clients to focus on creating products rather than maintaining server capability.

However, complex organizations consuming large amounts of virtual server resources often have difficulty tracking costs of virtual server usage. For instance, a large company may have many different operations, each requiring different virtual server resources. A management department may require storage on a virtual server, while research and development require processing for computational modeling, and a sales department may need a virtual server to host a web site.

Further, many different operations within an organization consume the same resources. A customer service chat and an online store may both require a virtual server hosting a website. Alternatively, a computer science department at a university may require processing power for various computational studies, such as training a machine learning algorithm and performing Monte Carlo simulations. However, virtual server providers often only report the aggregated cost of each resource, making it difficult for complex organizations to attribute accurately the portions of the total virtual server cost incurred by each operation. In the above examples, a company may be unable to determine how much money to allocate to provide an online help desk versus the online store, or the computer science department may be unable to determine how much of a certain grant to spend on virtual servers.

Accordingly, there is a need for systems and methods to associate virtual server costs with each of the various roles within an organization that require virtual server resources.

SUMMARY

One aspect of the present disclosure is directed to a computer-implemented system for resource usage tracking. The system comprises a memory storing instructions and at least one processor configured to execute the instructions to: receive a request to assign a first role to at least one virtual server; configure the virtual server to associate the first role with a first resource of the virtual server; modify a database to include an identifier associated with the virtual server and an identifier of the first role assigned to the virtual server; receive, from the virtual server, indications of first resource usage; calculate a first resource cost as a combination of costs associated with each of the received indications; map the first resource cost to the first role; and modify a user interface element for presentation on a web page to include the cost mapped to the first role.

Another aspect of the present disclosure is directed to a computer-implemented method for resource usage tracking. The method includes the steps of: receiving a request to assign a first role to at least one virtual server; configuring the virtual server to associate the first role with a first resource of the virtual server; modifying a database to include an identifier associated with the virtual server and an identifier of the first role assigned to the virtual server; receiving, from the virtual server, indications of first resource usage; calculating a first resource cost as a combination of costs associated with each of the received indications; mapping the first resource cost to the first role; and modifying a user interface element for presentation on a web page to include the cost mapped to the first role.

Another aspect of the present disclosure is directed to a computer-implemented system for resource usage tracking. The system comprises a memory storing instructions and at least one processor configured to execute the instructions to: receive a processing resource request from a first client; associate the request with a first role; determine a virtual server capable of providing the resource; configure the virtual server to associate the first role with a first resource of the virtual server; modify a database to include an identifier associated with the virtual server and an identifier of the first role assigned to the virtual server; receive, from the virtual server, a duration of processing provided in response to the request and a cost per unit time associated with the virtual server; calculate a first resource cost as a product of the duration and cost per unit time; map the first resource cost to the first role; modify a user interface element for presentation on a web page to include the cost mapped to the first role; and modify a user interface element for presentation on a web page to include the cost mapped to the first client.

Other systems, methods, and computer-readable media are also discussed herein.

DETAILED DESCRIPTION

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods for virtual server resource usage tracking.

Figure 1:
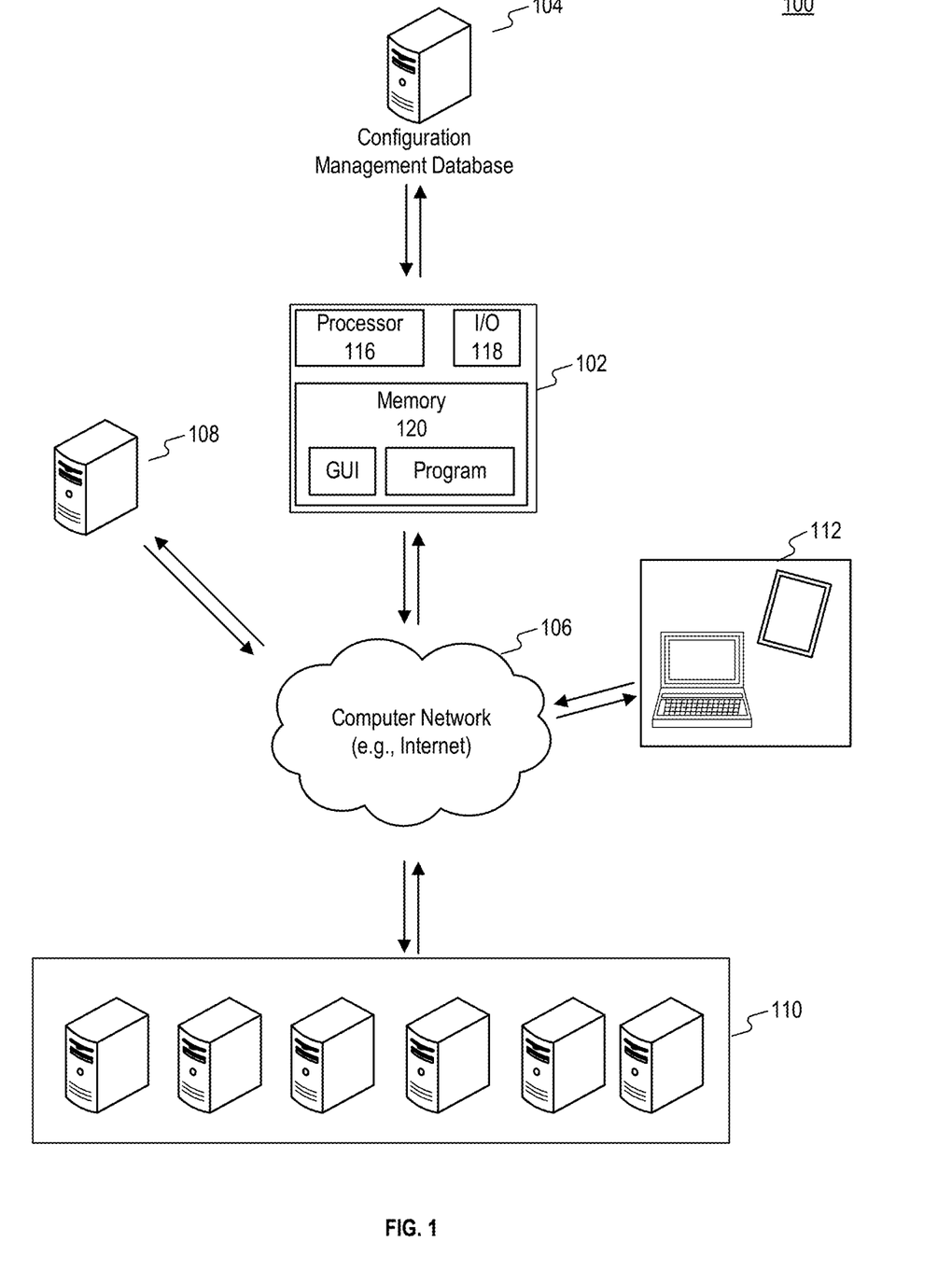
FIG. 1 illustrates a network including a client and virtual servers, consistent with the disclosed embodiments.

FIG. 1 shows a network 100 including a virtual server resource usage tracking system 102. The resource tracking system 102 includes at least one processor 116, an input/output (I/O) device that allows data to be transmitted 118, and at least one memory 120. The memory 120 stores a program for operating the IP categorization module. The memory 120 may also store instructions for a graphical user interface (GUI).

Furthermore, processor 116 may be a generic or specific electronic device capable of manipulating or processing information. For example, the processor may include any combination of any number of a central processing unit (or "CPU"), a graphics processing unit (or "GPU"), an optical processor, a programmable logic controllers, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), and any type of circuit capable of data processing. The processor may also be a virtual processor that includes one or more processors distributed across multiple machines or devices coupled via a network.

Additionally, the memory 120 may be a generic or specific electronic device capable of storing codes and data accessible by the processor (e.g., via a bus, not shown). For example, the memory may include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or any type of storage device. The codes may include an operating system (OS) and one or more application programs (or "apps") for specific tasks. The memory may also be a virtual memory that includes one or more memories distributed across multiple machines or devices coupled via a network.

System 102 is connected to a configuration management database (CMDB) 104. CMDB 104 may comprise a processor, I/O device, and memory. The memory of CMDB 104 may store configuration files for initializing virtual servers, such as necessary resource allocations including processor speeds and memory, stored variables, connection parameters including ports and IP addresses. CMDB 104 also may store user requests corresponding to roles for virtual server resources. In some embodiments, system 102 may concurrently operate as CMDB 104.

System 102 is connected to a computer network 106. For example, computer network 106 may include any combination of any number of the Internet, an Intranet, a Local-Area Network (LAN), a Wide-Area Network (WAN), a Metropolitan-Area Network (MAN), a virtual private network (VPN), a wireless network (e.g., compliant with the IEEE 802.11a/b/g/n), a wired network, a leased line, a cellular data network, and a network using Bluetooth connections, infrared connections, or Near-Field Communication (NFC) connections.

System 102 is further connected, either directly or via computer network 106, to client device 108. Client device 108 may be a laptop, standalone computer, mobile phone, and the like. A user may send virtual server resource requests through client device 108 to system 102. In some embodiments, system 102 may include client device 108 so that a single unit receives user requests and creates and stores configuration files. Alternatively, system 102 and client device 108 may be directly connected such that information exchanged between client device 108 and system 102 need not pass over computer network 106.

Additionally, system 102 communicates with virtual server provider 110. Provider 110 may, for instance, be a service operating a plurality of servers or general purpose computers, such as a server farm, which are available for rent or purchase. In some embodiments, provider 110 may charge a user for processing time, processor capability, storage, or connectivity, such as bandwidth. Provider 110 may also charge users a set baseline for connection to virtual servers, regardless of level of use, as a retainer to guarantee future access. Provider 110 may have servers and computers of varying capabilities, and may sell systems to users while charging maintenance fees. Other arrangements selling virtual server resources by provider 110 are possible as well.

In some embodiments, customer devices 112 may connect to services hosted by virtual servers of provider 110 via network 106. For example, a company may use servers operated by provider 110 to host an e-commerce website. Customer devices 112 may then connect to the e-commerce website via network 106. In this way, customers may access a company's website without directly accessing computers owned by the company, and instead interact with virtual servers operated by provider 110. This may provide a company with the convenience of not having organic employees to operate servers, and reduce costs by only paying for the amount of computing power the company needs. Alternatively, customer devices 112 may be research collaborators, for instance, who are able to share common data stored by the virtual servers of provider 110 or computing power without operating large server farms.

Figure 2:
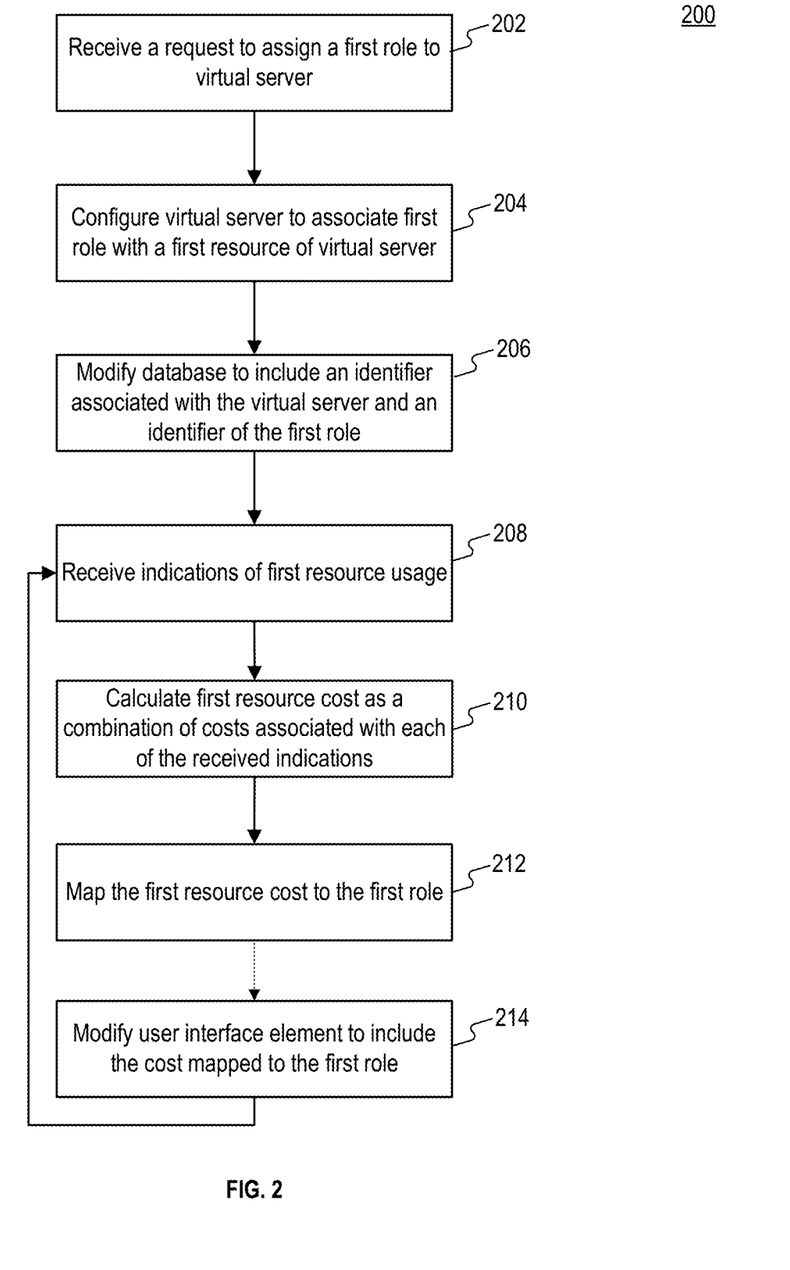
FIG. 2 is a flowchart of a resource usage tracking process, consistent with the disclosed embodiments.

FIG. 2 shows steps of a resource usage tracking process 200. System 102 may perform resource usage tracking process 200. For example, instructions for performing the resource usage tracking process 200 may be stored on the memory 120 and implemented by the processor of system 102. The resource usage tracking process 200 includes the following steps.

At step 202, system 102 receives a request to assign a first role to at least one virtual server. The request may originate from client device 108, either automatically by another process or by a user entering a request via client device 108. The first role may be, for instance, web site hosting, simulation process, or data storage. The request may specify a particular virtual server. Additionally, the request may also contain requirements such as processing time, processing power, storage, or bandwidth, for instance. Alternative, a user may initialize an operation using client device 108, and system 102 may determine the resources needed to accomplish the operation.

At step 204, system 102 configures the virtual server to associate the first role with a first resource of the virtual server. Associating a role with a resource may require system 102 (or the virtual server) to retrieve data, such as IP addresses and ports, from CMDB 104. Alternatively, software, code, initialization data or parameters, or digital assets may be copied from CMDB 104 or another storage and provided to the virtual server. System 102 may determine which resources are needed for the virtual server. The virtual server, on the other hand, may determine the needed resources based on the role contained in the request.

At step 206, system 102 modifies a database to include an identifier associated with the virtual server and an identifier of the first role assigned to the virtual server. The database may be, for instance, CMDB 104, memory 120, or stored on a virtual server. The database may record the virtual server identifier and the first role identifier in a SQL database, for example. Provider 110 may provide a unique identifier for the virtual server hosting the resource, such as an alphanumeric code, MAC address, IP address, or geophysical location including, for instance, a server warehouse location and server stack location within the warehouse. The virtual server identifier may also specify the resource of the virtual server performing the role.

At step 208, system 102 receives, from the virtual server, indications of first resource usage. The indications may be power consumption, processing duration, processor operations, bandwidth usage, storage, and the like. Further, the indications may include a cost per unit, such as cents per hour, cents per execution, or cents per floating point operation. The indications may comprise a cost per unit per time, such as cents per terabyte per month. Alternatively, cost per unit may be obtained separately from the indications of first resource usage. In some embodiments, the indications may further include information identifying the specific virtual server or account consuming the virtual server resource. The indications may be provided by an Application Programming Interface (API) operated by provider 110 or directly by the virtual serer.

At step 210, system 102 calculates a first resource cost as a combination of costs associated with each of the received indications. System 102 may determine the cost based on indications of first resource usage from step 208 as well as the cost per unit of resource usage. Furthermore, the cost may be a combination of costs accumulated over time. For example, a role may require a resource sporadically, rather than continuously, such that the first resource cost is a combination of costs incurred on various days. Alternatively, the first resource cost may be a combination of costs associated with a plurality of virtual servers. For instance, if a large database role requiring a first resource of storage is distributed across fifteen virtual servers, system 102 may receive fifteen indications of usage. The fifteen indications of usage may detail the amount of storage occupied on fifteen individual machines belonging to provider 110. System 102 may then determine the total cost of the storage of fifteen machines based on the received indications. In some embodiments, provider 110 may further charge a baseline access fee per virtual server or for access to the provider in general, such as a monthly subscription fee. System 102 may further calculate the first resource cost as including a portion of any baseline access fee, distributed proportionally by resource usage or by role.

At step 212, system 102 maps the first resource cost to the first role. System 102 may perform step 212 by correlating virtual server identifiers provided with the indications to virtual server identifiers stored in the database. Determining the virtual server identifier stored in the database will provide the first role associated with the virtual server at step 204, allowing system 102 to map the first resource cost to the first role.

In some embodiments, received indications may not include a virtual server identifier. System 102 may then determine the virtual server identifier by matching resource usage to other information from provider 110. For example, received indications may only contain a list of usage, such as 23 terabytes, 29 terabyte, 51 terabytes, and 81 terabytes of storage for a month. System 102 may access a provider website in an additional step to determine, for instance, which virtual server stored 23 terabytes during the month, thereby obtaining a virtual server identifier to enable mapping to the first role.

Furthermore, in some situations, system 102 may receive, from the virtual sever, indications of second resource usage. After comparing the resource usage to the database or other resources, such as provider information, system 102 may determine that the second resource is not associated with any role and terminate access to the second resource. For example, system 102 may receive indication of five hours of processing time costing $0.20 and no virtual server identifier. After analyzing the provider information, system 102 may determine that the virtual server responsible for the $0.20 charge was not attached to any role in the database and automatically terminate access to the server. As an example, system 102 may receive an indication of 2 terabytes of storage for a virtual server with identifier A623g.6. System 102 may search the database for a server having identifier A623g.6 but find no associated role, indicating, for instance, that a user had ceased the role and no longer requires the resource. System 102 may then terminate access to the second resource automatically. In some embodiments, system 102 may automatically reassign a different role to the virtual server resource having no associated role, or flag the unassociated resource for reassignment by a user.

At step 214, system 102 modifies a user interface element for presentation on a web page to include the cost mapped to the first role. Various modes of presentation may be used to display the cost, including pie charts, trend lines, or text display. Additionally, system 102 may complete additional analysis on cost mapped to the first role, such as identifying deviations from historical usage. In some embodiments, system 102 may process a plurality of roles, and modify user interface elements for the plurality of roles, as well as providing analysis of the roles in comparison to each other, such as flagging unusually expensive roles or roles that exceed a preset budget.

System 102 may further map the first resource cost and the first role to a group. For example, a company may have multiple groups, such as website operation, customer service, deliveries, research and development, and management. Each group may be responsible for multiple roles. For instance, the research and development department may operate multiple modeling roles individually resulting in small costs, but a large aggregate cost. In addition to tracking resource usage for each role, a company may also desire to track resource usage for each group. To aid this, system 102 may further modify a user interface element for presentation on a web page to include the first resource cost mapped to the first organization. This method may also be useful for universities or research institutions tracking resource usage across multiple academic departments, grant recipients, research endeavors, and the like.

System 102 may also map the first resource cost to a client. For example, a user may submit a resource request using a first client having an identifier, such as MAC address, IP address, computer name, or user login information. System 102 may associate the first client with the first resource, and modify a user interface element for presentation on a web page to include the cost mapped to the first client. This may allow an organization to track resource usage for individual users or clients, aiding identification of expensive clients, or clients that are unproductive.

After step 214, system 102 may return to step 208 and receive additional indications and continue tracking resource usage. The period for the cycle may be time-based, such as once per hour, or event-based, such as on demand or once a resource usage passes a threshold.

Figure 3:
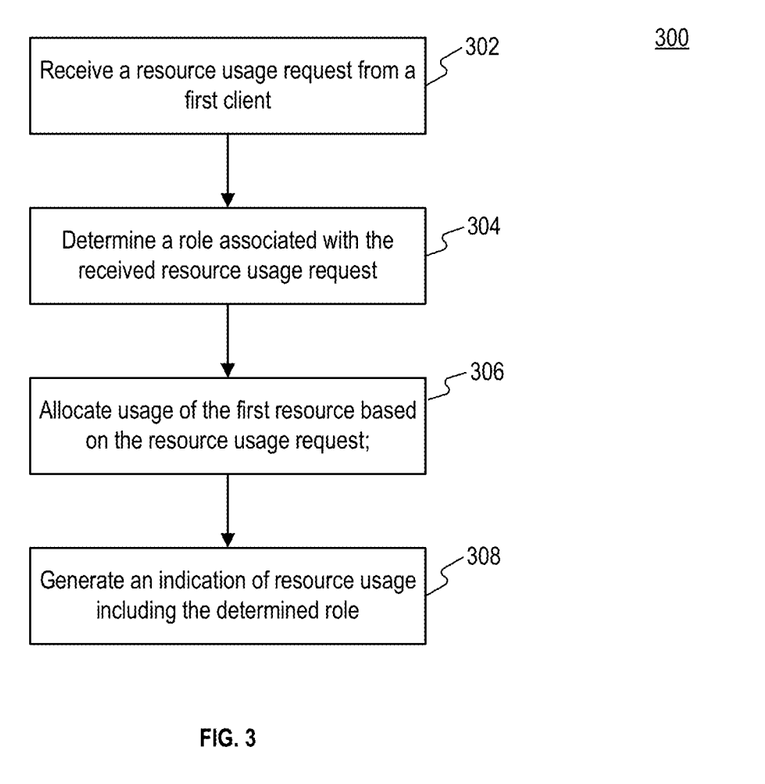
FIG. 3 is a flowchart of a resource usage allocation and tracking process, consistent with the disclosed embodiments.

FIG. 3 shows steps of a resource usage allocation and tracking process 300. System 102 may configure the virtual server to perform resource usage tracking process 300. The resource usage tracking process 300 includes the following steps.

At step 302, the virtual server receives a resource usage request from a first client. A user may use client device 108 to initiate the request. A user may initiate a generalized request for a resource, such as indicating that storage is needed. A user may also provide a detailed request for an operation, a request to modify data in a database, a request to store data, or a request to transfer data. Requests to transfer data may include, for instance, transferring data between databases or providing a website to a consumer, and may be measured in bandwidth usage. Client device 108 may communicate directly with the virtual server to alter or initiate usage request, or may communicate with the virtual server through system 102.

At step 304, the virtual server determines a role associated with the received resource usage request. The virtual server may determine the role based on the identity of the first client. For example, the first client may have a MAC address or IP address associated with a particular department having a known role. A user may also indicate the role when making the request. In some embodiments, system 102 may determine the role based on similarities between the resource usage request and the resource usage requests of other roles, and provide the role to the virtual server.

At step 306, the virtual server allocates usage of the first resource based on the resource usage request. The first resource may include, for example, processing, storage, or connectivity, or a combination thereof, according to the resource usage request. The virtual server may allocate an amount of time or storage based on the resource usage request. In some embodiments, the virtual server may reserve the time or storage exclusively for the resource usage request, while charging the user a baseline reservation fee. Alternatively, the virtual server may accommodate multiple roles to the same resource on an as-needed basis.

At step 308, the virtual server generates an indication of resource usage, the generated indication including the determined role. The virtual server may be configured by system 102 to generate the indication, for instance, by including the indication in a program that the virtual server runs. The indication may be provided automatically to system 102, for instance, via email, or on demand in response to a request by system 102. Further, the virtual server may be configured to pre-format the indication of resource usage for quicker processing by system 102.

Figure 4:
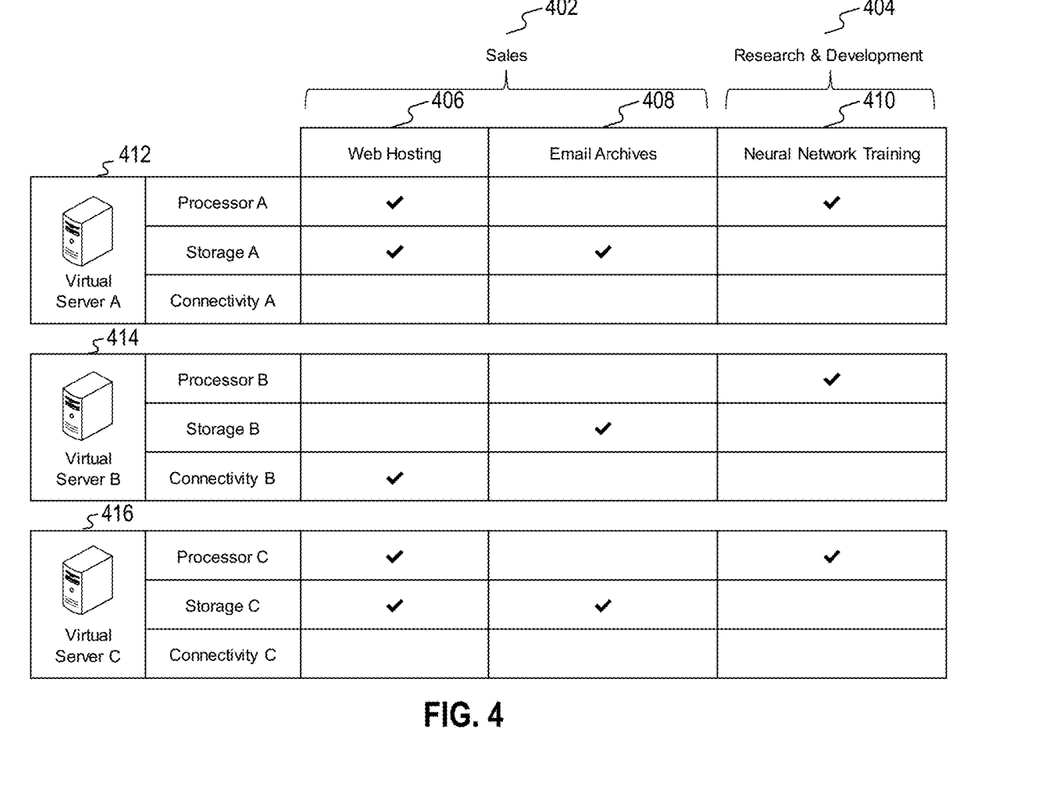
FIG. 4 illustrates associations of roles and resources of multiple virtual servers, consistent with the disclosed embodiments.

FIG. 4 illustrates an exemplary association of roles and resources of multiple virtual servers. FIG. 4 shows two organizations, sales group 402 and research and development group 404. Sales group 402 includes two roles, web hosting role 406 and email archives role 408, while research and development group 404 includes neural network training role 410.

Web hosting role 406 of sales group 402 requires processing, storage, and connectivity. As shown in FIG. 4, these three requirements may be distributed among multiple virtual servers. For instance, virtual server A 412, virtual server B 414, and virtual server C 416 provide a resource to web hosting role 406. In this way, a single role may utilize resources from a plurality of virtual servers. In some instances, a role may use the same resource type of multiple servers, as web hosting role 406 uses storage of virtual server A 412 and storage of virtual server C 416. This may occur if a single virtual server is unable to meet the needs of a role, due to device limitations or competing allocations from other roles.

Further, FIG. 4 illustrates that a virtual server may comprise a plurality of roles, each role being associated with at least on resource of the virtual server. For example, virtual server B 414 provides processing to neural network training role 410, storage to email archives role 408, and connectivity to web hosting role 406. Additionally, an individual resource may be associated with a plurality of roles. For instance, storage of virtual server A 412 is associated with web hosting role 406 and email archives role 408.

In this manner, the first role may be distributed among many different servers, thereby accessing greater resources than a single server could provide, or selecting particular resources tailored to the role but not available in a single server, such as mixing an expensive high power processor with inexpensive small storage capability. Users may thereby maximize efficiency and reduce cost.

Figure 5:
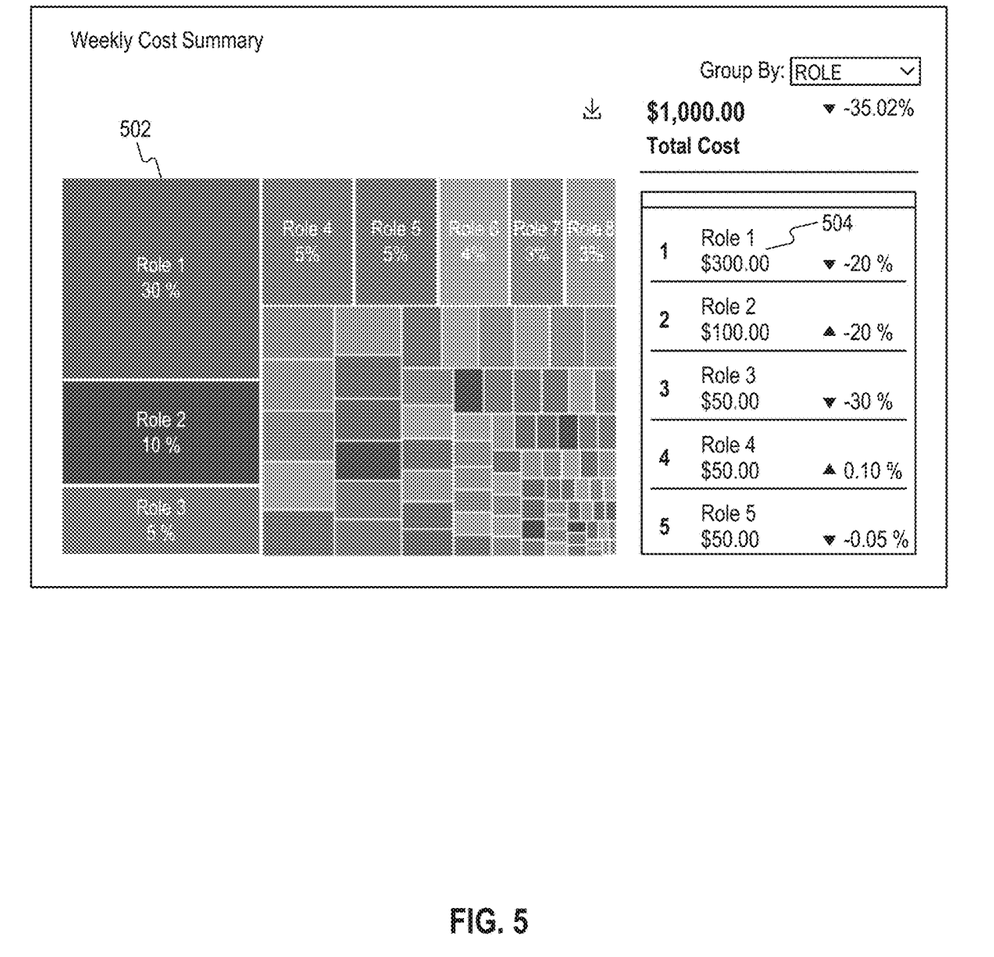
FIG. 5 illustrates user interface elements presented on a web page, consistent with the disclosed embodiments.

FIG. 5 illustrates user interface elements presented on a web page. System 102 may combine costs from multiple roles and for presentation as user interface elements. For example, chart 502 shows a plurality of roles with associated portions of the total virtual server cost. Chart 502 may also include pie charts, line charts showing progression over time, and the like. Cost may be aggregated over various durations, such as weeks, days, or months, to be selected automatically or by a user. Additionally, ranking 504 shows an ordered list of the roles by ascending cost, descending cost, percentage change, alphabetical order, and the like. Further, system 102 may aggregate individual roles by group, thus showing a comparison of virtual server costs between groups.

As an exemplary embodiment of the present disclosure a computer-implemented system for resource usage tracking includes a memory storing instructions and at least one processor configured to execute the instructions. The instructions cause the system to receive a processing resource request from a first client and associate the request with a first role. The system determines a virtual server capable of providing the resource and configures the virtual server to associate the first role with a first resource of the virtual server. The system also modified a database to include an identifier associated with the virtual server and an identifier of the first role assigned to the virtual server. The system then receives, from the virtual server, a duration of processing provided in response to the request and a cost per unit time associated with the virtual server, and calculates a first resource cost as a product of the duration and cost per unit time. The system also maps the first resource cost to the first role. The system then modifies a user interface element for presentation on a web page to include the cost mapped to the first role, and modifies a user interface element for presentation on a web page to include the cost mapped to the first client. In some embodiments, the client and role are also mapped to a group.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for resource usage tracking, the system comprising:
   a memory storing instructions; and
   at least one processor that executes the instructions to:
   receive a request to assign a first role to at least one virtual server, wherein the first role comprises one of a Web Hosting role, an Email Archives role or a Neutral Network Training role, and wherein the request specifies a particular virtual server;
   configure the particular virtual server to associate the first role with a first resource of the virtual particular server;
   modify a database to include an identifier associated with the virtual particular server and an identifier of the first role assigned to the virtual particular server;
   receive, from the virtual particular server, indications of first resource usage;
   calculate a first resource cost as a combination of costs associated with each of the received indications;
   map the first resource cost to the first role, wherein the mapping includes mapping the first resource cost and the first role to a group;
   modify a user interface element for presentation on a web page to include the cost mapped to the first role and additionally modify the user interface element for presentation on the web page to include the first resource cost mapped to the group;
   receive, from the virtual particular server, indications of an ongoing second resource usage;
   determine that the second resource is not associated with any role; and
   terminate access to the second resource.

2. The system of claim 1, wherein the first role is associated with a plurality of virtual servers.

3. The system of claim 1, wherein the particular virtual server comprises a plurality of roles, each role being associated with at least one resource of the virtual server.

4. The system of claim 3, wherein at least one resource of the particular virtual server is associated with a plurality of roles.

5. The system of claim 1, wherein associating the first role with the first resource of the particular virtual server comprises configuring the particular virtual server to:
   receive a resource usage request from a first client;
   determine a role associated with the received resource usage request;
   allocate usage of the first resource based on the resource usage request; and
   generate an indication of resource usage, the generated indication including the determined role.

6. The system of claim 5, wherein
   the first resource comprises processing, storage, or connectivity; and
   the resource usage request comprises at least one of a request to perform an operation, a request to modify data in a database, a request to store data, or a request to transfer data.

7. The system of claim 1, wherein the identifier associated with the particular virtual server is an Internet Protocol (IP) address.

8. The system of claim 1, wherein the indications are provided by an Application Programming Interface (API).

9. A computer-implemented method for resource usage tracking, the method comprising:
   receiving a request to assign a first role to at least one virtual server, wherein the first role comprises one of a Web Hosting role, an Email Archives role, or a Neural Network Training role, and wherein the request specifies a particular virtual server;
   configuring the particular virtual server to associate the first role with a first resource of the particular virtual server;
   modifying a database to include an identifier associated with the particular virtual server and an identifier of the first role assigned to the particular virtual server;
   receiving, from the particular virtual server, indications of first resource usage;
   calculating a first resource cost as a combination of costs associated with each of the received indications;
   mapping the first resource cost to the first role, wherein the mapping includes mapping the first resource cost and the first role to a group;
   modifying a user interface element for presentation on a web page to include the cost mapped to the first role, and additionally modifying the user interface element for presentation on the web page to include the first resource cost mapped to the group;
receiving, from the particular virtual server, indications of an ongoing second resource usage;
determining that the second resource is not associated with any role; and
terminating access to the second resource.

10. The method of claim 9, wherein the first role is associated with a plurality of virtual servers.

11. The method of claim 9, wherein the particular virtual server comprises a plurality of roles, each role being associated with at least one resource of the particular virtual server.

12. The method of claim 11, wherein at least one resource of the particular virtual server is associated with a plurality of roles.

13. The method of claim 9, wherein associating the first role with the first resource of the particular virtual server comprises configuring the particular virtual server to:
receive a resource usage request from a first client;
determine a role associated with the received resource usage request;
allocate usage of the first resource based on the resource usage request; and
generate an indication of resource usage, the generated indication including the determined role.

14. The method of claim 13, wherein
the first resource comprises processing, storage, or connectivity; and
the resource usage request comprises at least one of a request to perform an operation, a request to modify data in a database, a request to store data, or a request to transfer data.

15. The method of claim 9, wherein the identifier associated with the virtual server is an Internet Protocol (IP) address.

16. The method of claim 9, wherein the indications are provided by an Application Programming Interface (API).

17. A computer-implemented system for resource usage tracking, the system comprising:
a memory storing instructions; and
at least one processor configured to execute the instructions to:
receive a processing resource request from a first client;
associate the request with a first role, wherein the first role comprises one of a Web Hosting role, an Email Archives role, or a Neural Network Training role, and wherein the processing resource request specifies a particular virtual server;
determine a particular virtual server capable of providing the resource;
configure the particular virtual server to associate the first role with a first resource of the particular virtual server;
modify a database to include an identifier associated with the particular virtual server and an identifier of the first role assigned to the particular virtual server;
receive, from the virtual server, a duration of processing provided in response to the request and a cost per unit time associated with the particular virtual server;
calculate a first resource cost as a product of the duration and cost per unit time;
map the first resource cost to the first role, wherein the mapping includes mapping the first resource cost and the first role to a group;
modify a user interface element for presentation on a web page to include the cost mapped to the first role;
modify a user interface element for presentation on a web page to include the cost mapped to the first client;
receive, from the particular virtual server, indications of an ongoing second resource usage;
determine that the second resource is not associated with any role; and
terminate access to the second resource.

* * * * *